United States Patent [19]
Gustin et al.

[11] Patent Number: 5,931,881
[45] Date of Patent: Aug. 3, 1999

[54] STEERING CURVE CALIBRATION METHOD AND APPARATUS FOR A RUBBER TIRED PAVER

[75] Inventors: Craig R. Gustin, Rochelle; Keith R. Schmidt, Sycamore, both of Ill.

[73] Assignee: Caterpillar Paving Products Inc., Minneapolis, Minn.

[21] Appl. No.: 08/764,677

[22] Filed: Dec. 11, 1996

[51] Int. Cl.⁶ ..................................... G06F 7/00
[52] U.S. Cl. ..................... 701/41; 701/69; 180/197; 180/248
[58] Field of Search ................... 701/1, 25, 41, 701/208, 224, 69, 70, 71, 72, 74, 89; 180/233, 234, 236, 400, 197, 247, 248

[56] References Cited

U.S. PATENT DOCUMENTS

| | | | |
|---|---|---|---|
| 4,471,273 | 9/1984 | Melocik et al. | 318/55 |
| 4,541,051 | 9/1985 | Jarret et al. | 701/22 |
| 4,556,940 | 12/1985 | Katoo et al. | 701/25 |
| 4,914,592 | 4/1990 | Callahan et al. | 701/41 |
| 5,079,708 | 1/1992 | Brown | 364/424.05 |
| 5,099,938 | 3/1992 | Watanabe et al. | 180/415 |
| 5,154,437 | 10/1992 | Inagaki et al. | 280/91 |
| 5,258,912 | 11/1993 | Ghoneim et al. | 701/42 |
| 5,343,393 | 8/1994 | Hirano et al. | 701/41 |
| 5,345,382 | 9/1994 | Kao | 701/224 |
| 5,376,868 | 12/1994 | Toyoda et al. | 701/22 |
| 5,394,327 | 2/1995 | Simon, Jr. et al. | 701/1 |
| 5,481,460 | 1/1996 | Masaki et al. | 701/50 |
| 5,487,437 | 1/1996 | Avitan | 180/6.5 |
| 5,787,374 | 7/1998 | Ferguson et al. | 701/41 |
| 5,805,449 | 9/1998 | Ito | 180/443 |

FOREIGN PATENT DOCUMENTS 0415619 8/1990 European Pat. Off. ........ F16H 1/445

*Primary Examiner*—William A. Cuchlinski, Jr.
*Assistant Examiner*—Gertrude Arthur
*Attorney, Agent, or Firm*—Steven G. Kibby; David M. Masterson

[57] ABSTRACT

In one aspect of the present invention, a method for controlling the steering of a directionally steered machine having a hydrostatic system that drives a plurality of driven wheels is provided. The method includes the steps of producing a steering angle signal indicative of the angle of the steered wheels and a wheel speed signal indicative of the rotational speed of the driven wheels, and generating a programmable curve that represents the resulting driven wheel speeds as a function of the angle of the steered wheels. The generated curve is then stored in a software map to be later used to determine the driven wheel speeds based on the angle of the steered wheels.

9 Claims, 4 Drawing Sheets

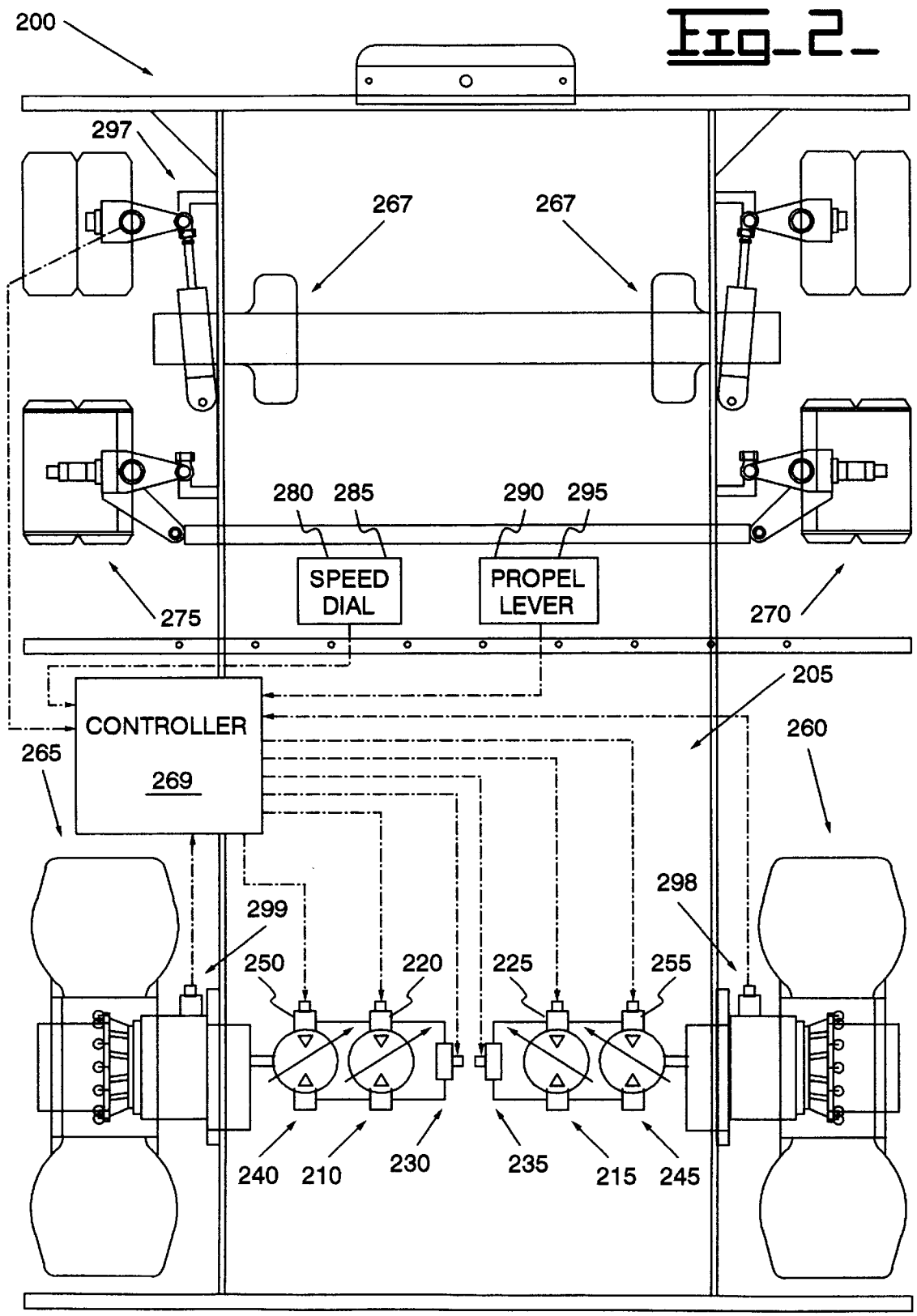

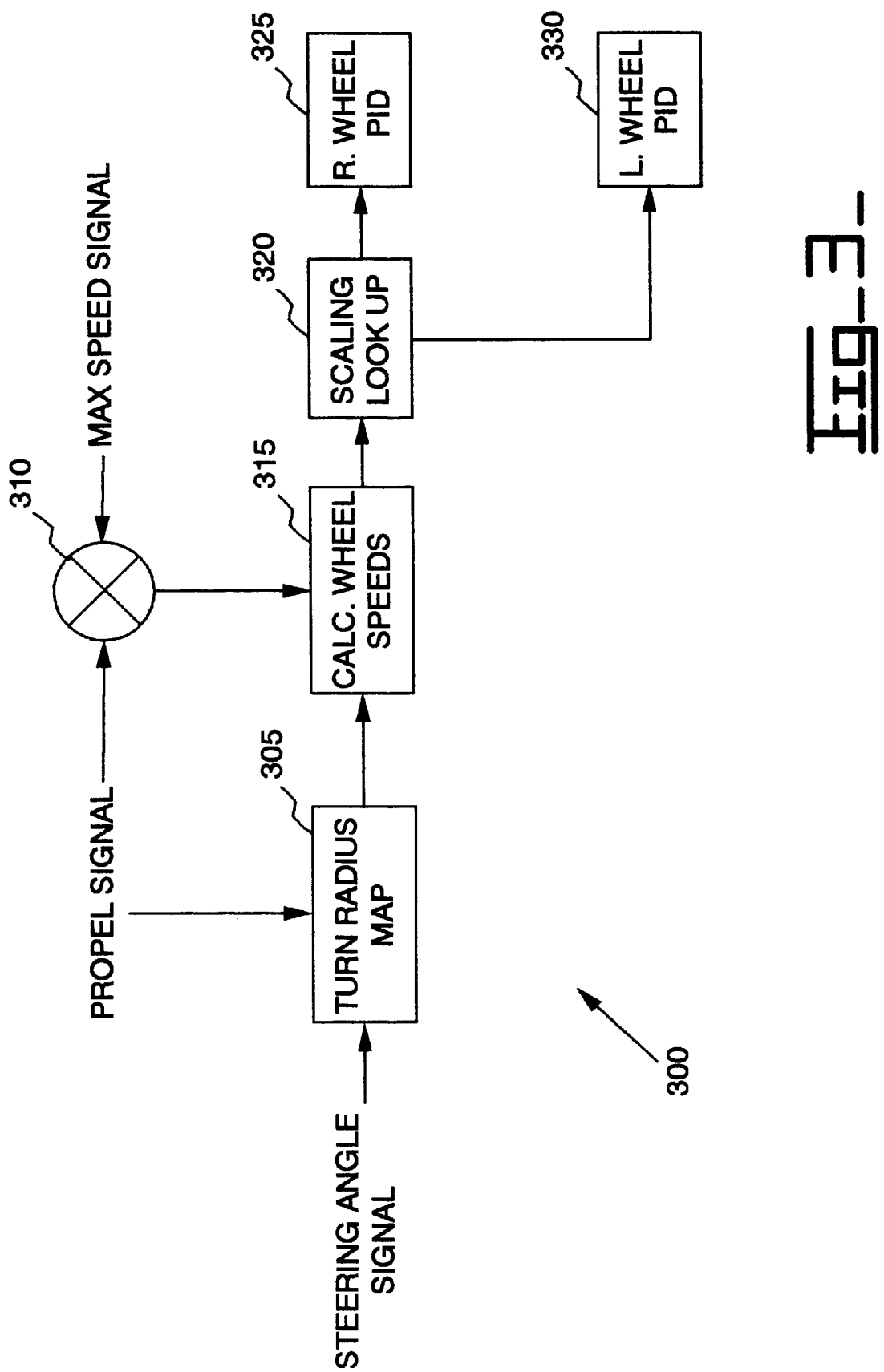

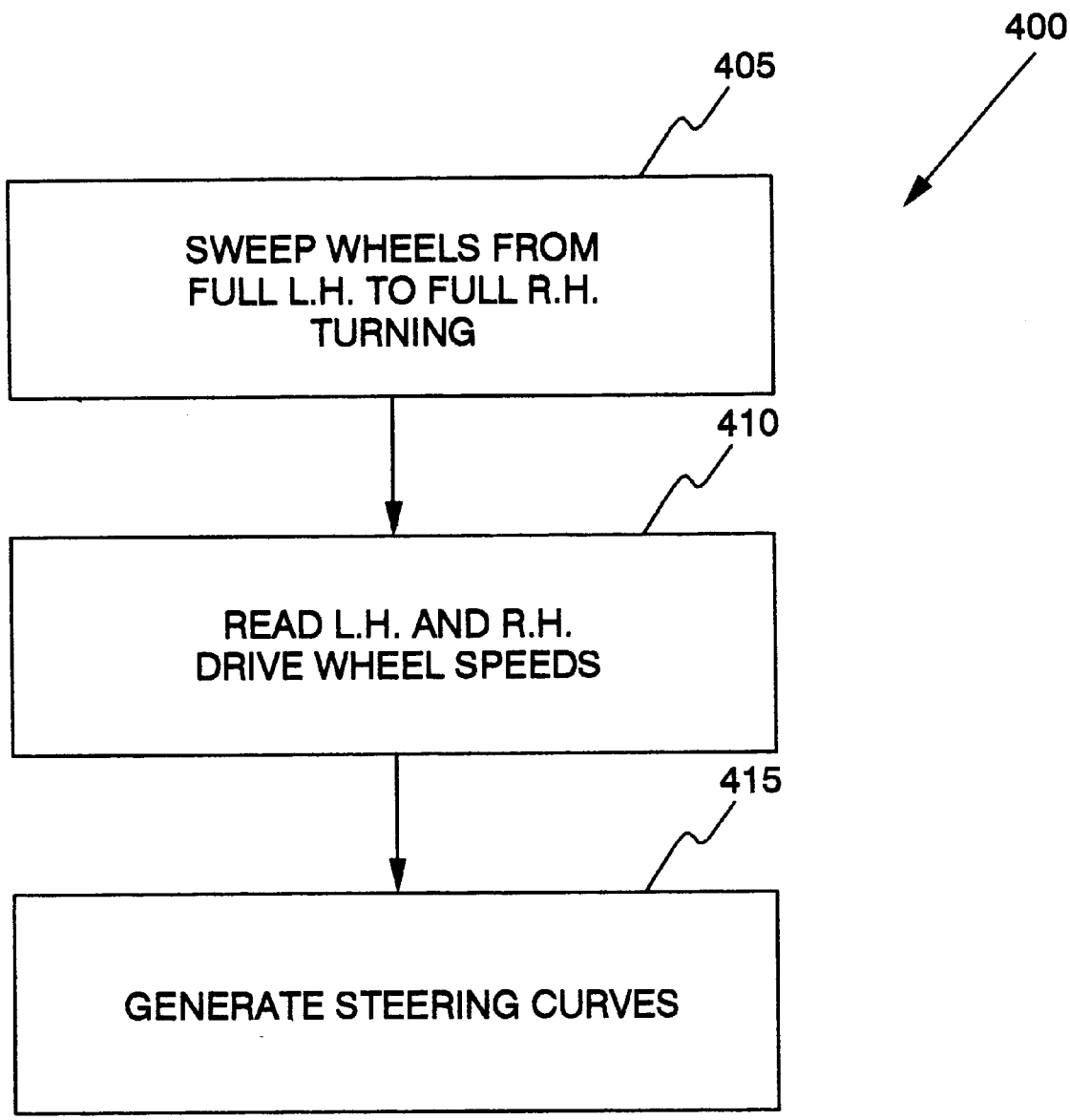
Fig_4_

5,931,881

STEERING CURVE CALIBRATION METHOD AND APPARATUS FOR A RUBBER TIRED PAVER

TECHNICAL FIELD

This invention relates generally to an apparatus and method for steering a dual path directionally steered machine and, more particularly, to an apparatus and method for calibrating steering curves associated with a steering control system of a paver.

BACKGROUND ART

Asphalt pavers include a hopper for receiving paving material and a conveyor system for transferring the paving material from the hopper for discharge on the roadbed. Screw augers spread the material on the roadbed in front of a floating screed, which is connected to the paving machine by pivoting tow or draft arms. The screed functions to format and compact the paving material distributed by the augers, ideally leaving the finished road with a uniform, smooth surface.

Such machines may be propelled by using rubber wheels that are disposed on opposite sides of the machine. Typical rubber wheeled machines have front steerable or steered wheels and a mechanical differential that drives the rear driven wheels. However, this type of machine cannot effectively control wheel slip by directing power to only one wheel.

A second alternative drive system is to independently drive each driven wheel. The independent drive requirement creates the problem of controlling the relative speed of each wheel to appropriately follow the turn path of the front steered wheels, while providing full power with minimal slip to each wheel. A closed loop electronic control system is one method to provide the required control. However, one difficulty of designing such a control is defining the control relationship between the right and left driven wheels so that the individual operating characteristics of an individual machine are taken into account.

The present invention is directed to resolve these problems by determining the control relationship between the right and left driven wheels in order to follow the path of the steered wheels. Additionally, the present invention modifies the control relationship to provide for enhanced turning capabilities by overdriving the driven wheels.

DISCLOSURE OF THE INVENTION

In one aspect of the present invention, a method for controlling the steering of a directionally steered machine having a hydrostatic system that drives a plurality of driven wheels is provided. The method includes the steps of producing a steering angle signal indicative of the angle of the steered wheels and a wheel speed signal indicative of the rotational speed of the driven wheels, and generating a programmable curve that represents the resulting driven wheel speeds as a function of the angle of the steered wheels.

BRIEF DESCRIPTION OF THE DRAWINGS

For a better understanding of the present invention, reference may be made to the accompanying drawings in which:

FIG. 2 illustrates an electronic control system for a hydrostatic drive system of the paver;

FIG. 3 illustrates a high level block diagram of a steering control method; and

FIG. 4 illustrates a high level block diagram of a steering curve calibration routine.

BEST MODE FOR CARRYING OUT THE INVENTION

Figure 1:
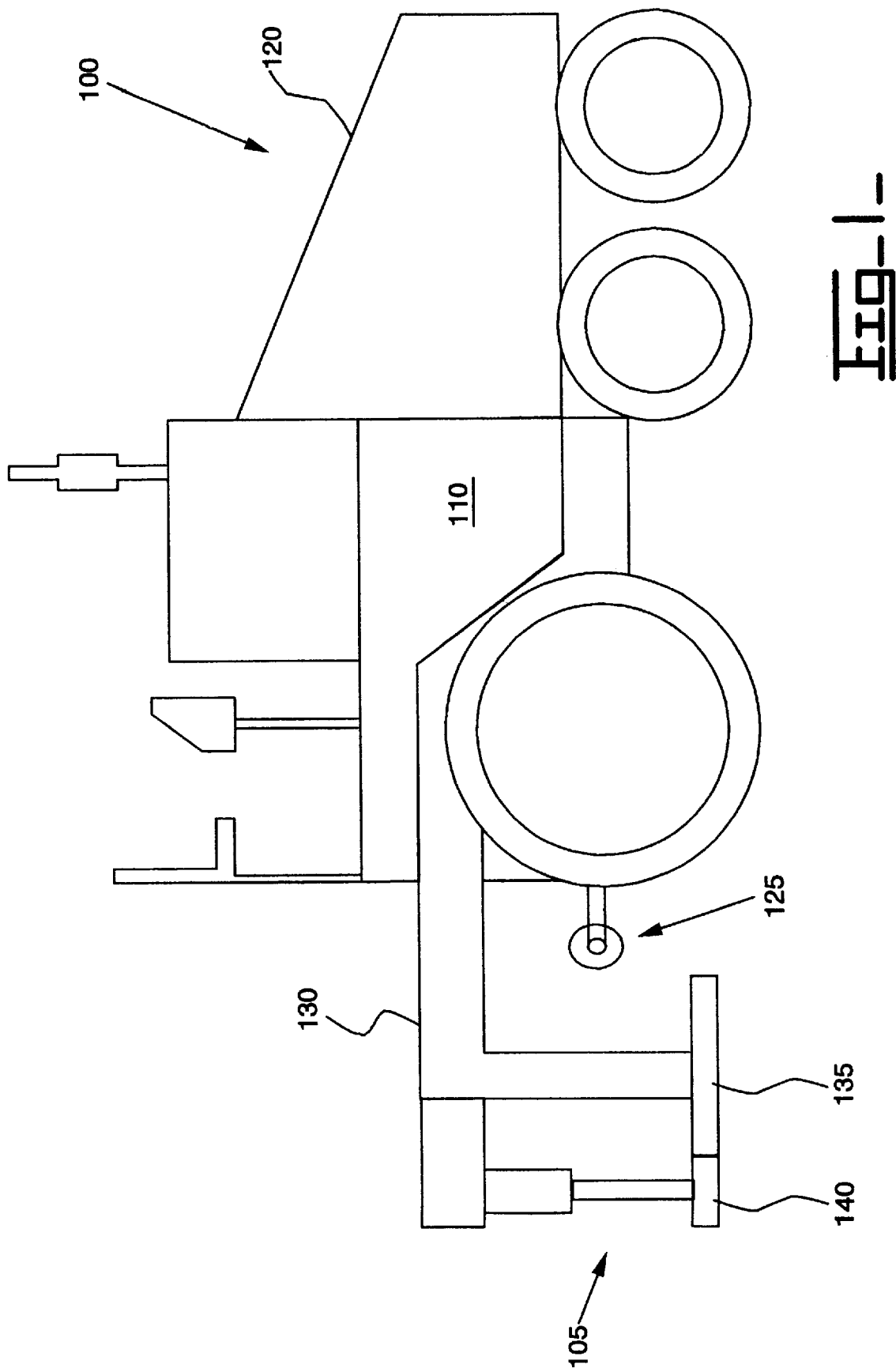
FIG. 1 illustrates a side view of an asphalt paver.

The present invention is directed toward a calibration method that provides for coordinated wheel drive control of dual path directionally steered machine. Referring now to the drawings, FIG. 1 illustrates one type of a dual path directionally steered machine, e.g., a paver 100 of the rubber tire type. The paver 100 has a chassis 110 through which dual feed conveyors carry paving material, such as asphalt material, from a feed hopper 120 located at the front of the paver 100. Spreader augers 125, also referred to as spreading screws, are disposed transversely to and at the rear of the chassis 110. The augers 125 distribute the asphalt material transversely to the direction of travel of the paver 100. The material is spread over the desired width of a strip of pavement. The thickness and width of the pavement is established by the material-compacting, screed assembly 105. As shown, the screed assembly 105 is attached to the chassis 110 by a pair of draft arms 130. Preferably, the screed assembly 105 includes a main screed 135 and an extendible or extension screed 140. The main screed 135 is formed in two sections, one on each side of the center line of the paver. The extension screed 140 is mounted to each of the main screed sections.

An electronic control system 200 for an hydrostatic drive system 205 of the paver 100 is shown in FIG. 2. The hydrostatic drive system 205 includes an internal combustion engine (not shown) that drives two variable displacement hydraulic pumps 210,215. The swashplate of each pump is actuable by a displacement actuator 220,225. Preferably, each displacement actuator includes a directional solenoid 230,235 that controls the output flow and direction of the respective pump, i.e., either forward or reverse. Each pump 210,215 provides high pressure fluid to a variable displacement motor 240,245, which includes a displacement solenoid 250,255 that is used to actuate the displacement of the respective motor. The motors 240,245 are used to provide the necessary torque in order to propel the machine via a right and left set of driven wheels 260,265. The machine steering is controlled via a mechanical steering mechanism 267 that controls the angle of a right and left set of steering wheels 270,275.

The electronic control system 200 includes a microprocessor based controller 269 that includes system memory. The controller 269 receives various sensing signals and controls the displacement of the pumps 210,215 and motors 240,245 in order to regulate the speed and steering of the machine.

A speed dial 280 is provided for the operator to set the maximum travel speed of the machine based on the engine speed. Accordingly, a speed dial sensor 285 produces a maximum travel speed signal that is proportional to the rotational position of the speed dial 275.

A propel lever 290 is provided for the operator to indicate a desired direction of machine travel, e.g., forward, reverse, or neutral. The propel lever 290 additionally controls the acceleration or de-acceleration of the machine by indicating the desired percent of maximum travel speed. Accordingly, a propel lever sensor 295 produces a propel signal that is indicative of the desired direction of machine travel and desired percent of maximum travel speed in response to the relative position of the propel lever 290.

A steering sensor 297 produces a steering angle signal that is responsive to the steering angle of the right and left set of the steering wheels. Preferably, the steering sensor 297 is mounted integral with a king pin assembly of the steering mechanism 267.

A right wheel speed sensor 298 produces a right speed signal in response to the rotation of the right driven wheel. A left wheel speed sensor 299 produces a left speed signal in response to the rotation of the left driven wheel. Preferably, the speed sensors 298,299 are mounted integral with the respective motors 240,245 to monitor the rotation of the respective driven wheels.

The controller 269 utilizes arithmetic units to control various processes according to software programs. Typically, the programs are stored in read-only memory, random-access memory or the like.

One such process is shown with reference to FIG. 3, which shows a high level block diagram of a steering control method 300. Advantageously, the steering control method 300 provides for the machine to turn with a constant radius that is independent to travel speed or engine speed.

A software look-up table routine 305 receives the steering angle signal and the propel signal, and selects a turning radius value that is indicative of a desired turning radius. For example, the software look-up table routine may include a map for the forward and reverse travel directions. Moreover, each map may include several curves that are programmable to provide for different steering or handling characteristics. For example, each curve represents a desired turning radius as a function of the desired steering angle for a predetermined speed range. Moreover, the driven wheels may be controlled with a differential speed to enhance the steering characteristics.

A multiplication block 310 receives the propel and maximum speed signal and produces a desired travel speed signal in response to the product of the received signals. A wheel speed calculation routine 315 receives the desired travel speed signal and the turning radius value, and determines the rotational speed of the outer and inner driven wheel speeds. For example, the outer and inner wheel speeds are calculated as follows:

Turn Radius Equations:

$$V_{outer} = V_{desired}(2 - 2R/G + 2R)$$
$$V_{inner} = V_{outer}(R/R + G)$$

where:
$V_{desired}$ = the desired machine travel speed;
R = the turning radius value; and
G = the gage of the machine, i.e., the width between the wheel centers.

A software look-up routine 320 receives signals representative of the calculated outer and inner driven wheel speeds and retrieves a pump command signal magnitude for each pump. Accordingly, feedback controllers 325,330 receive the pump command signals and deliver the signals to the respective pump solenoids in order to control the flow of fluid to the respective motors. For example, each feedback controller receives signals representative of the desired and actual wheel speeds, compares the wheel speeds to each other, and adjusts the respective pump command signal magnitude in order to control the actual wheel speed to the desired wheel speed. The feedback controllers 325,330 may use well known proportional plus integral control strategies to produce the respective pump command signals having sufficient magnitudes to accurately regulate the wheel speeds.

The present invention is directed toward a method 400 for calibrating or generating the steering curves that are stored in the memory of the controller. The method is illustrated by the block diagram shown in FIG. 4. At block 405, the operator sweeps the front wheels from a full left hand turn to a full right hand turn. In block 410, as the operator is sweeping the front wheels, the controller reads the steering angle from the steering angle signal, and the left and right driven wheel speeds from the left and right wheel speed signals. Responsively, in block 415, the microprocessor generates a steering curve for use in a turn radius maps at the particular machine travel speed. The curve represents the resulting driven wheel speeds as a function of the angle of the steered wheels. The operator may repeat the above steps to create a family of steering curves, each for a different machine travel speed.

As described, the present invention provides a method that generates a software map that is comprised of one or a plurality of programmable curves, each corresponding to a particular desired speed. Each curve represents a desired turning radius as a function of the desired steering angle and wheel speed. Consequently, this method compensates for machine dynamic variations in steering characteristics from one machine to the next.

Advantageously, the generated curves are programmable to provide for enhanced turning capabilities. For example, the generated curves may be modifiable by multiplying each value of a particular curve by a factor to overdrive the driven wheels. This aspect of overdriving the wheels creates additionally steering forces by the rear wheels to provide for a "tighter" turn, i.e., smaller turn radius, than that indicated by the steering angle signal.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

As described, the present invention is particularly suited to control the steering of an asphalt paver. In order to be more operator friendly than typical asphalt pavers, the control apparatus associated with the present invention controls the actual turning radius of the machine to be independent to machine speed to simulate the steering and feel of an automobile. Moreover, the present invention provides for a calibration routine which generates steering curves that provide for enhanced steering characteristics.

Other aspects, objects and advantages of the present invention can be obtained from a study of the drawings, the disclosure and the appended claims.

We claim:

1. An apparatus for controlling the steering of a directionally steered machine having a set of left and right independently driven wheels and a set of steered wheels, comprising:

a steering angle sensor that produces a steering angle signal indicative of the angle of the steered wheels;

wheel speed sensors that produce wheel speed signals indicative of the rotational speeds of the left and right driven wheels; and a controller that receives the wheel speed and steering angle signals, responsively generates a programmable curve that represents the resulting driven wheel speeds as a function of the angle of the steered wheels, and stores the generated curve in a software map.

2. An apparatus, as set forth in claim 1, wherein the controller receives the steering angle signal, utilizes the generated curve to determine desired rotational speeds of the driven wheels to propel the machine at a desired steering radius, and produces command signals indicative of the desired rotational speeds of the driven wheels; and means for receiving the command signals and responsively controlling the speed of the driven wheels to the desired speed to cause the machine to propel at the desired turn radius.

3. An apparatus, as set forth in claim 2, including:

a plurality of hydraulic motors for driving a respective driven wheel; and a plurality of variable displacement pumps for delivering pressurized fluid to the hydraulic motors in response to receiving command signals.

4. An apparatus, as set forth in claim 2, wherein the controller is a microprocessor.

5. A method for controlling the steering of a directionally steered machine having a set of left and right independently driven wheels and a set of steered wheels, comprising the steps of:

producing a steering angle signal indicative of the angle of the steered wheels;

producing wheel speed signals indicative of the rotational speed of the left and right driven wheels; and receiving the wheel speed and steering angle signals, generating a programmable curve that represents the resulting driven wheel speeds as a function of the angle of the steered wheels, and storing the generated curve in a software map.

6. A method, as set forth in claim 5, including the steps of:

producing a desired travel speed signal indicative of a desired speed of machine travel; and receiving the desired travel speed, wheel speed and steering angle signals and generating a plurality of programmable curves, each corresponding to different desired travel speeds.

7. A method, as set forth in claim 6, including the steps of receiving the desired travel speed and steering angle signals, selecting a curve from the software map in response to a desired travel speed and utilizing the curve to produce a desired turning radius signal in response to the desired steering angle.

8. A method, as set forth in claim 7, including the steps of:

producing a maximum speed signal indicative of a maximum travel speed;

producing a propel signal indicative of a desired percentage of maximum travel speed and direction of travel;

producing a desired travel speed signal in response to the maximum speed signal and propel signal; and determining the desired rotational speed of the driven wheels in response to desired travel speed and turning radius signals.

9. A method, as set forth in claim 7, including the steps of multiplying each value of a particular curve by a factor to overdrive the driven wheels and provide for a smaller turn radius than that indicated by the steering angle signal.

* * * * *